United States Patent
Yoneyama et al.

(10) Patent No.: US 10,197,013 B2
(45) Date of Patent: Feb. 5, 2019

(54) SUCTION TUBE OF STRATIFIED SCAVENGING ENGINE

(71) Applicant: YAMABIKO CORPORATION, Ohme-shi, Tokyo (JP)

(72) Inventors: Kazuhiro Yoneyama, Tokyo (JP); Hiroshi Miyazaki, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 70 days.

(21) Appl. No.: 15/612,366

(22) Filed: Jun. 2, 2017

(65) Prior Publication Data

US 2018/0023515 A1    Jan. 25, 2018

(30) Foreign Application Priority Data

Jul. 20, 2016   (JP) .................................. 2016-142615

(51) Int. Cl.
    *F02M 19/06*    (2006.01)
    *F02B 25/02*    (2006.01)
    (Continued)

(52) U.S. Cl.
    CPC ............. *F02M 19/06* (2013.01); *F02B 17/00* (2013.01); *F02B 25/02* (2013.01); *F02B 25/04* (2013.01);
    (Continued)

(58) Field of Classification Search
    CPC ................. F01M 19/06; F01M 23/001; F01M 35/10078; F01M 35/1019;
    (Continued)

(56) References Cited

U.S. PATENT DOCUMENTS 6,289,856 B1    9/2001 Noguchi
7,261,281 B2    8/2007 Raffenberg
(Continued)

FOREIGN PATENT DOCUMENTS

DE    10 2010 007065 A1    8/2011
EP         3 026 250 A1    6/2016
(Continued)

OTHER PUBLICATIONS

Extended Search Report in corresponding European Application No. 17174004.6, dated Sep. 1, 2017, 4 pages.

*Primary Examiner* — Syed O Hasan
(74) *Attorney, Agent, or Firm* — Brinks, Gilson & Lione

(57) ABSTRACT

A suction tube of a stratified scavenging engine that can improve the flexibility in designing the shapes and layouts of an air-fuel mixture passage and an air passage; allow for continuous and smooth changes in the shapes of the cross sections of the air-fuel mixture passage and the air passage from the inlet side toward the outlet side; reduce the number of components; and facilitate attachment and assembly; and that is also advantageous in terms of cost is provided. The suction tube includes an air-fuel mixture passage and an air passage, inlet and outlet sides of the passages being connected to a carburetor and a cylinder, respectively; a cylindrical exterior member that mainly forms an outer perimeter portion of each of the air-fuel mixture passage and the air passage; and an interior member for dividing the inside of the cylindrical exterior member into the air-fuel mixture passage and the air passage. With the use of elastic deformation of the interior member or the cylindrical exterior member, the interior member is attached to and integrally formed with the inside of the cylindrical exterior member.

8 Claims, 11 Drawing Sheets

(51) Int. Cl.
  *F02F 1/22* (2006.01)
  *F02M 23/00* (2006.01)
  *F02M 35/10* (2006.01)
  *F02B 17/00* (2006.01)
  *F02B 25/04* (2006.01)
  *F02B 25/22* (2006.01)
  *F02B 33/04* (2006.01)
  *F02B 33/44* (2006.01)

(52) U.S. Cl.
  CPC .............. *F02B 25/22* (2013.01); *F02B 33/04* (2013.01); *F02B 33/44* (2013.01); *F02F 1/22* (2013.01); *F02M 23/001* (2013.01); *F02M 35/1019* (2013.01); *F02M 35/10078* (2013.01); *F02M 35/10196* (2013.01); *F02M 35/10262* (2013.01); *F02M 35/10321* (2013.01); *F02M 35/10255* (2013.01); *F02M 35/10268* (2013.01)

(58) Field of Classification Search
  CPC ....... F01M 35/10196; F01M 35/10262; F01M 35/10321; F01M 35/10255; F02B 17/00; F02B 25/02; F02B 25/22; F02B 33/04; F02F 1/22

USPC .......................................................... 123/590
  See application file for complete search history.

(56) References Cited

U.S. PATENT DOCUMENTS

| | | | |
|---|---|---|---|
| 7,513,225 B2* | 4/2009 | Geyer | F02B 25/22 123/184.23 |
| 8,215,278 B2* | 7/2012 | Kummermehr | F02B 25/14 123/184.52 |
| 2005/0073062 A1 | 4/2005 | Zwimpfer et al. | |
| 2005/0120985 A1 | 6/2005 | Rosskamp | |
| 2008/0035091 A1 | 2/2008 | Geyer et al. | |
| 2012/0152218 A1* | 6/2012 | Grether | F02M 13/04 123/73 R |
| 2016/0153346 A1 | 6/2016 | Ohsawa et al. | |

FOREIGN PATENT DOCUMENTS

| | | |
|---|---|---|
| JP | S61-182452 A | 8/1986 |
| JP | 3313373 B | 8/2002 |
| JP | 2006-316753 A | 11/2006 |
| JP | 2016-102463 A | 6/2016 |

* cited by examiner

Cross-section taken along line C-C of FIG. 1

Cross-section taken along line B-B of FIG. 1

Cross-section taken along line A-A of FIG. 1

Cross-section taken along line C-C of FIG. 5

Cross-section taken along line B-B of FIG. 5

Cross-section taken along
line A-A of FIG. 5

SUCTION TUBE OF STRATIFIED SCAVENGING ENGINE

RELATED APPLICATIONS

The present application claims priority from Japanese patent application JP 2016-142615 filed on Jul. 20, 2016, the content of which is hereby incorporated by reference into this application.

BACKGROUND OF THE INVENTION

1. Field of the Invention

The present invention relates to a suction tube that also functions as an insulator and that is disposed between an engine main body (cylinder) and a carburetor of a stratified scavenging engine, and particularly relates to a suction tube, which has an air-fuel mixture passage and an air passage for stratified scavenging, of a stratified scavenging engine.

2. Description of the Related Art

Traditionally, stratified scavenging two-stroke engines, which are advantageous in complying with exhaust gas emission regulations of various countries, have been often used as power sources for portable power working machines such as a brush cutter and a chain saw. Some of such stratified scavenging two-stroke engines have a suction tube that also functions as an insulator for suppressing transmission of the heat of an engine main body (cylinder) to a carburetor and that is disposed between the engine main body and the carburetor, as also disclosed in, for example, Patent Documents 1 and 2.

Such a suction tube has formed therein an air passage for stratified scavenging as well as an air-fuel mixture passage for supplying air-fuel mixture generated in the carburetor. In the stratified scavenging two-stroke engine having such a suction tube, in order to reduce a so-called blow-by amount of fresh air (unburned air-fuel mixture) mainly, in conjunction with the vertical movement of a piston, air is stored in advance in a scavenging passage provided on a wall portion of the cylinder via the air passage of the suction tube. In the scavenging stroke, the air stored in the scavenging passage is first blown out from a scavenging port to a combustion chamber above the piston, and air-fuel mixture that has been pre-compressed in a crankcase below the piston is then blown out from the scavenging port to the combustion chamber above the piston, thereby discharging (scavenging) flue gases to an exhaust port.

As also disclosed in the aforementioned Patent Documents 1 and 2, the carburetor used in the aforementioned stratified scavenging two-stroke engine has a passage portion with a circular cross section in which butterfly choke and throttle valves are disposed. When both the valves are in the fully open position, the passage portion with a circular cross section is divided into two passages, each of which has a substantially semi-circular cross section, allowing both the valves to function as partitioning wall portions. Alternatively, as in the rotary carburetor with a similar configuration disclosed in Patent Document 3, a passage on one side of the valves in the fully open position (passage on the side where a fuel hole is provided) is connected to the air-fuel mixture passage of the suction tube, and a passage on the other side of the valves is connected to the air passage of the suction tube.

Herein, traditional suction tubes (for example, those disclosed in FIG. 5 of Patent Document 1 and Patent Document 2) for suppressing the transmission of the heat to the carburetors are integrally formed using rubber or resin. Specifically, such traditional suction tubes are each made of an integral cylindrical member whose inlet cross section has an outline that coincides with that of the passage portion with a circular cross section of the carburetor, and a thin plate-like partition portion, for example, which is aligned with the throttle valve in the fully open position, is provided inside the cylindrical member, so that the inside of the cylindrical member is divided into an air-fuel mixture passage and an air passage by the partition portion.

3. Related Art Patent Documents

Patent Document 1: JP 2016-102463 A
Patent Document 2: U.S. Pat. No. 7,513,225 B
Patent Document 3: U.S. Pat. No. 7,261,281 B
Patent Document 4: JP 3,313,373 B

SUMMARY OF THE INVENTION

The aforementioned suction tube (which is also referred to as a suction tube with a partition portion) that is divided into the air-fuel mixture passage and the air passage by the partition portion has the following problems to be solved.

Specifically, in the stratified scavenging two-stroke engine, the suction tube has different required sizes and shapes on the inlet side (carburetor side) and outlet side (cylinder side) of each of the air-fuel mixture passage and the air passage. For example, the shape of the end portion on the inlet side (carburetor side) of each of the air-fuel mixture passage and the air passage is substantially semi-circular so as to correspond to the circular passage portion of the end portion of the carburetor, while the shape of the end portion on the outlet side (cylinder side) of the air-fuel mixture passage may have various shapes, such as a substantially rectangular or an elliptic shape, having an enlarged opening area relative to the shape of the end portion on the inlet side (carburetor side) thereof. In addition, the end portion on the outlet side (cylinder side) of the air passage is in a horizontally elongated rectangular, a quadrilateral (for example, see FIG. 8 of Patent Document 4 above), or an arc shape, having a relatively large opening area so as to supply air to passages for scavenging (scavenging ports) provided in pair, via grooves provided on a piston.

As stated above, because of such differences in the shapes on the inlet and outlet sides of the passages, for producing such a suction tube with a partition portion through die molding, such as injection molding, a mold with a complex structure is required. Therefore, the shapes and layouts of the air-fuel mixture passage and the air passage are significantly restricted, and it is thus quite difficult to allow for continuous and smooth changes in the shapes of the cross sections of the passages from the inlet side toward the outlet side, specifically, changes, for example, in the shapes of the cross sections of the air-fuel mixture passage from a semi-circular shape to a rectangular shape and the air passage from a semi-circular shape to a horizontally elongated rectangular shape. Without continuous and smooth changes in the cross sections of the air-fuel mixture passage and the air passage, the air-fuel mixture and air do not smoothly flow and as a result, required engine performance cannot be obtained.

It should be noted that with the aim of solving the problems of the aforementioned suction tube with the partition portion, Patent Document 1 above discloses a suction tube in which each of the air-fuel mixture passage and the air passage includes an individual tubular member made of rubber, the two tubular members made of rubber are baked on an adapter made of resin, a flange made of a sheet metal, or the like so as to be integrated therewith, and the adapter and the flange are securely fastened with bolts or the like to the carburetor and the cylinder, respectively, so as to attach the suction tube to an area between the cylinder and the carburetor. However, such a configuration disclosed in Patent Document 1 requires more components and more time for attaching and assembling of the components, and thus is costly.

The present invention has been made in view of the foregoing circumstances, and it is an object of the present invention to provide a suction tube of a stratified scavenging engine that can improve the flexibility in designing the shapes and layouts of the air-fuel mixture passage and the air passage, allow for continuous and smooth changes in the shapes of the cross sections of the air-fuel mixture passage and the air passage from the inlet side toward the outlet side, reduce the number of components, and facilitate the attachment and assembly, and that is advantageous also in terms of cost.

With the aim of achieving the aforementioned object, the suction tube of a stratified scavenging engine according to the present invention that basically has an air-fuel mixture passage and an air passage, an inlet side and an outlet side of each passage being connected to a carburetor and a cylinder, respectively, includes a cylindrical exterior member for mainly forming an outer perimeter portion of each of the air-fuel mixture passage and the air passage and an interior member for dividing an inside of the cylindrical exterior member into the air-fuel mixture passage and the air passage. The interior member is attached to and integrally formed with the inside of the cylindrical exterior member with the use of elastic deformation thereof or of the cylindrical exterior member.

The interior member preferably has a partition portion for dividing the inside of the cylindrical exterior member into the air-fuel mixture passage and the air passage, and an inner perimeter portion of the cylindrical exterior member has formed thereon fitting grooves into which opposite end portions of the partition portion are fitted.

In a more specific and preferred aspect, the interior member has a partition portion for dividing the inside of the cylindrical exterior member into the air-fuel mixture passage and the air passage, upper left and right side wall portions that ascend from left and right end portions on the upper surface side of the partition portion, and lower left and right side wall portions that descend from left and right end portions on the lower surface side of the partition portion, and an inner perimeter portion of the cylindrical exterior member has formed thereon upper side fitting grooves and lower side fitting grooves into which the upper left and right side wall portions and the lower left and right side wall portions are fitted, respectively.

In another preferred aspect, the interior member has a tubular portion for forming one of the air-fuel mixture passage and the air passage inside the cylindrical exterior member, and the cylindrical exterior member is provided with a retaining portion for retaining the tubular portion therein.

In a more specific and preferred aspect, the interior member has a tubular portion for forming one of the air-fuel mixture passage and the air passage inside the cylindrical exterior member, an inlet side flange portion provided on the inlet side of the tubular portion, and an outlet side flange portion provided on the outlet side of the tubular portion; a portion between the inlet side flange portion and the outlet side flange portion of the tubular portion faces and contacts an inner perimeter surface of the cylindrical exterior member; and an inlet side fitting groove and an outlet side fitting groove into which the inlet side flange portion and the outlet side flange portion are fitted, respectively, are formed on an inlet side end portion and an outlet side end portion of the cylindrical exterior member, respectively.

In this case, in a more preferred aspect, the inside of the cylindrical exterior member is provided with a partition portion for inserting and fitting thereinto the portion between the inlet side flange portion and the outlet side flange portion of the tubular portion.

In a further preferred aspect, the inlet side flange portion and the outlet side flange portion and/or the inlet side fitting groove and the outlet side fitting groove are provided so as to extend to a side of one of the passages that is not formed by the tubular portion, and an inlet and/or an outlet of the one of the passages that is not formed by the tubular portion is/are formed in the extended portions of the inlet side flange portion and/or the outlet side flange portion, respectively.

In another preferred aspect, the interior member with the tubular portion forms the air-fuel mixture passage.

In yet another preferred aspect, the interior member with the tubular portion forms the air passage.

In a further preferred aspect, the interior member has a partition portion for partially dividing the inside of the cylindrical exterior member into the air-fuel mixture passage and the air passage and a tubular portion for forming a portion of one of the air-fuel mixture passage and the air passage, and the cylindrical exterior member is provided with a retaining portion for retaining the interior member therein.

In a still further preferred aspect, the interior member has a tubular portion for forming one of the air-fuel mixture passage and the air passage and a short tubular portion for forming a portion of the other of the air-fuel mixture passage and the air passage, and the cylindrical exterior member is provided with a retaining portion for retaining the interior member therein.

In a preferred aspect of the present invention, one of the cylindrical exterior member and the interior member is made of rubber, and the other is made of resin.

In another preferred aspect, a surface to be sealed to the carburetor and/or a surface to be sealed to the cylinder is/are formed on an end face(s) of the cylindrical exterior member or the interior member that is made of rubber.

In a preferred aspect of the present invention, the cylindrical exterior member is provided with attaching portions for attachment to the carburetor and the cylinder.

Since the suction tube of the stratified scavenging engine according to the present invention is configured such that the two components of the cylindrical exterior member and the interior member that have been individually formed are assembled together, a mold with a complicated structure is not required, the flexibility in designing the shapes and layouts of the air-fuel mixture passage and the air passage can be improved, and continuous and smooth changes in the shapes of the cross sections of the air-fuel mixture passage and the air passage from the inlet side toward the outlet side are easily realized. Therefore, the air-fuel mixture and air smoothly flow and as a result, the required engine performance can be obtained.

Further, since the interior member is attached to and formed integrally with the inside of the cylindrical exterior member with the use of the elastic deformation of the cylindrical exterior member or the interior member that is made of rubber, it is possible to reduce the number of components, facilitate the attachment and assembly, and reduce the production cost as compared to traditional suction tubes that are formed such that an air-fuel mixture passage and an air passage, which are formed of individual tubular members, are connected together using an adapter or the like.

DETAILED DESCRIPTION OF THE PREFERRED EMBODIMENTS

The embodiments of the present invention will be described with reference to the drawings.

First Embodiment

Figure 1:
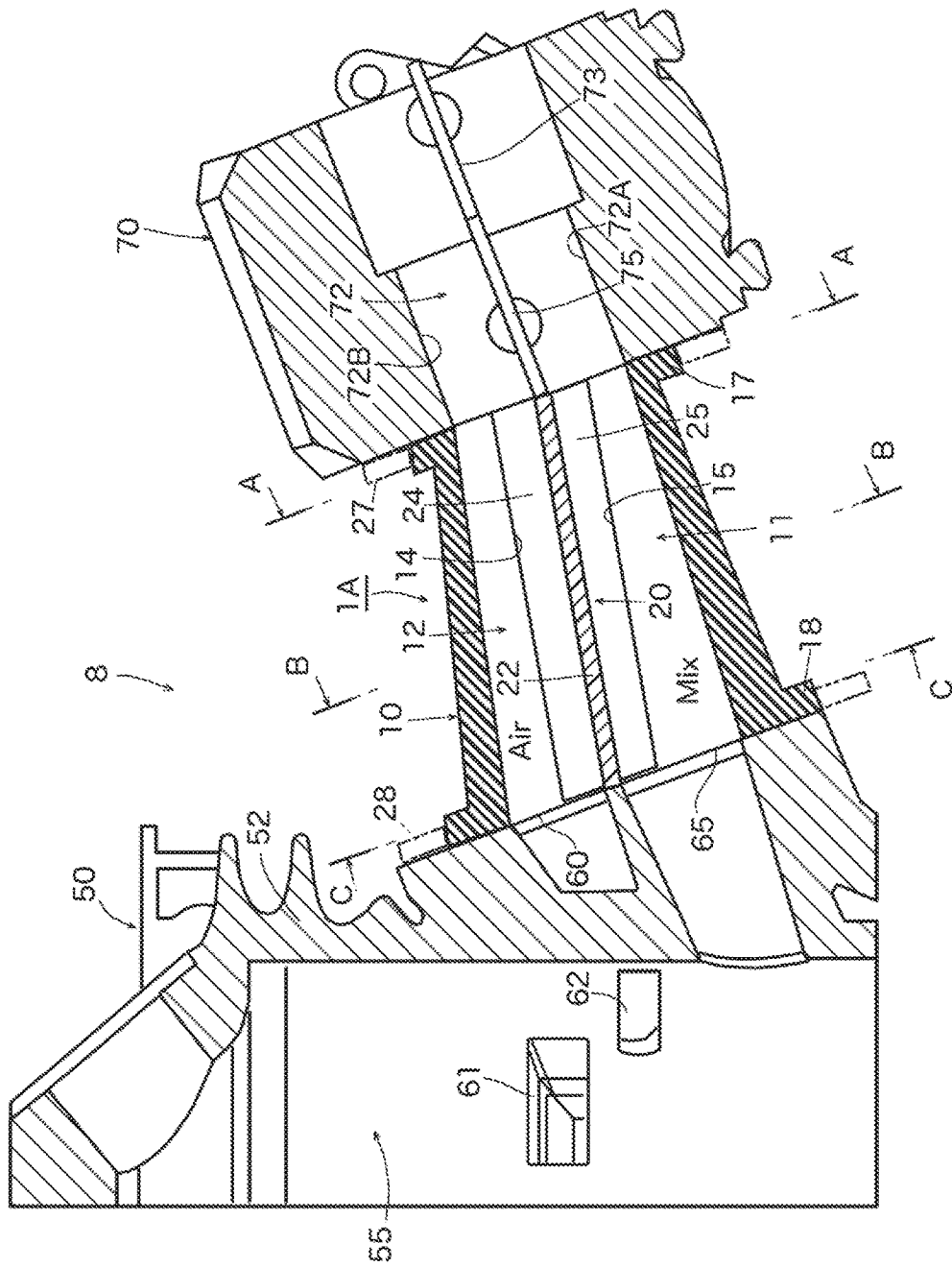
FIG. 1 is a schematic cross-sectional view showing the main part of a stratified scavenging two-stroke engine to which a first embodiment of a suction tube of a stratified scavenging engine according to the present invention is applied.

FIG. 1 is a schematic cross-sectional view showing the main part of a stratified scavenging two-stroke engine to which a first embodiment of a suction tube of a stratified scavenging engine according to the present invention is applied.

Regarding a stratified scavenging two-stroke engine 8 shown in the drawing as an example, since the configuration of the stratified scavenging two-stroke engine is well known, only portions related to the present invention will be briefly explained. A body portion 52 of a cylinder 50 that forms a main part of an engine main body has formed therein an air-fuel mixture port 65 that is opened and closed by means of a piston (not shown), an air port 60 that is, also by means of the piston, brought into communication with a left and right pair of scavenging ports 61 and 62, and an exhaust port (not shown). One combustion cycle is completed through two-strokes of the piston instead of individual strokes only for sucking air and only for discharging air.

A carburetor 70 is connected to the cylinder 50 via a suction tube 1A of the first embodiment. The carburetor 70 has a passage portion with a circular cross section 72 in which a butterfly choke valve 73 and throttle valve 75 are disposed. When both the valves 73 and 75 are in the fully open position, the passage portion with a circular cross section 72 is divided into two passages 72A and 72B, each of which has a semi-circular cross section, allowing both the valves 73 and 75 to function as partitioning wall portions. In this case, the passage 72A on one side (herein the lower side) of the valves 73 and 75 in the fully open position is provided with a fuel supply hole (not shown) and in the passage 72A on this side, air-fuel mixture (Mix) is generated, and only air (Air) flows through the passage 72B on the other side (herein, the upper side).

The suction tube 1A also functions as an insulator for suppressing transmission of the heat of the engine main body (cylinder 50) to the carburetor 70, and has formed therein an air-fuel mixture passage 11 and an air passage 12 (herein, the air-fuel mixture passage 11 and the air passage 12 are formed on the lower side and the upper side, respectively). The inlet side and the outlet side of the air-fuel mixture passage 11 are connected to the passage 72A on the lower side of the carburetor 70 and the air-fuel mixture port 65 of the cylinder 50, respectively. Further, the inlet side and the outlet side of the air passage 12 are connected to the passage 72B on the upper side of the carburetor 70 and the air port 60 of the cylinder 50, respectively.

Figure 2A:
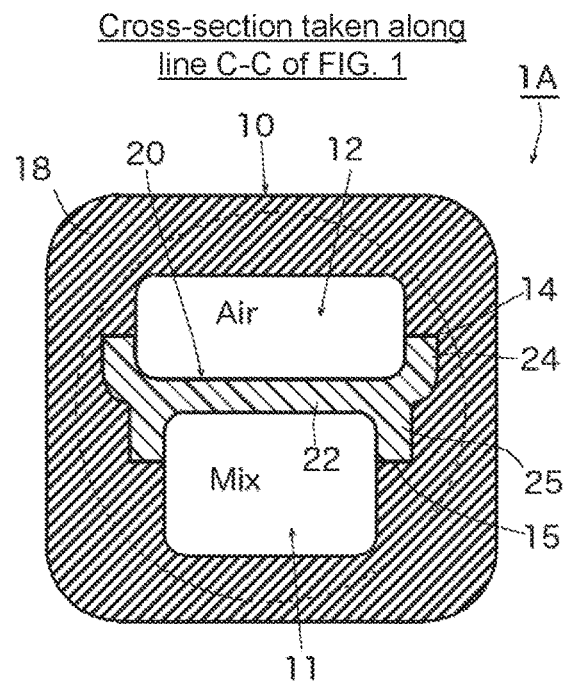
FIG. 2A is a cross-sectional view taken along line C-C of FIG. 1.
Figure 2B:
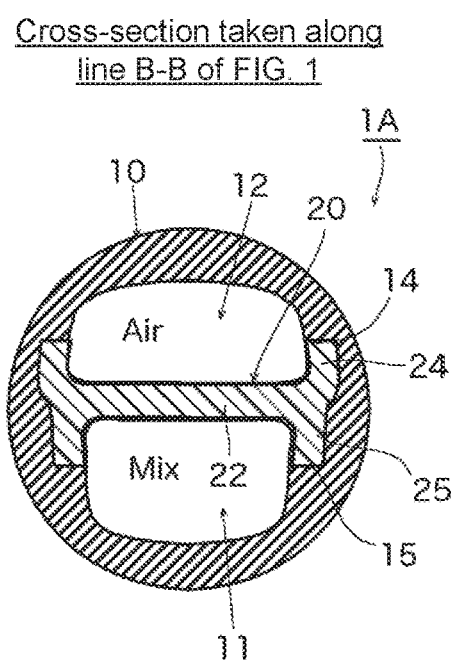
FIG. 2B is a cross-sectional view taken along line B-B of FIG. 1.
Figure 2C:
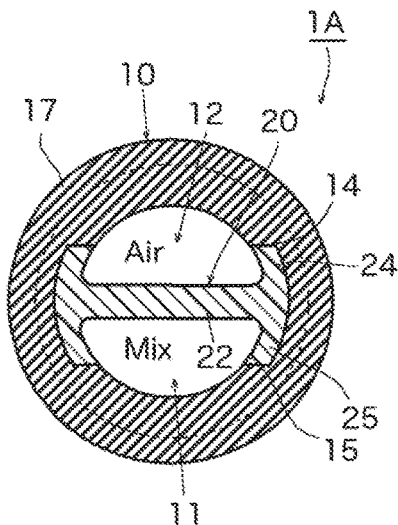
FIG. 2C is a cross-sectional view taken along line A-A of FIG. 1.
Figure 3:
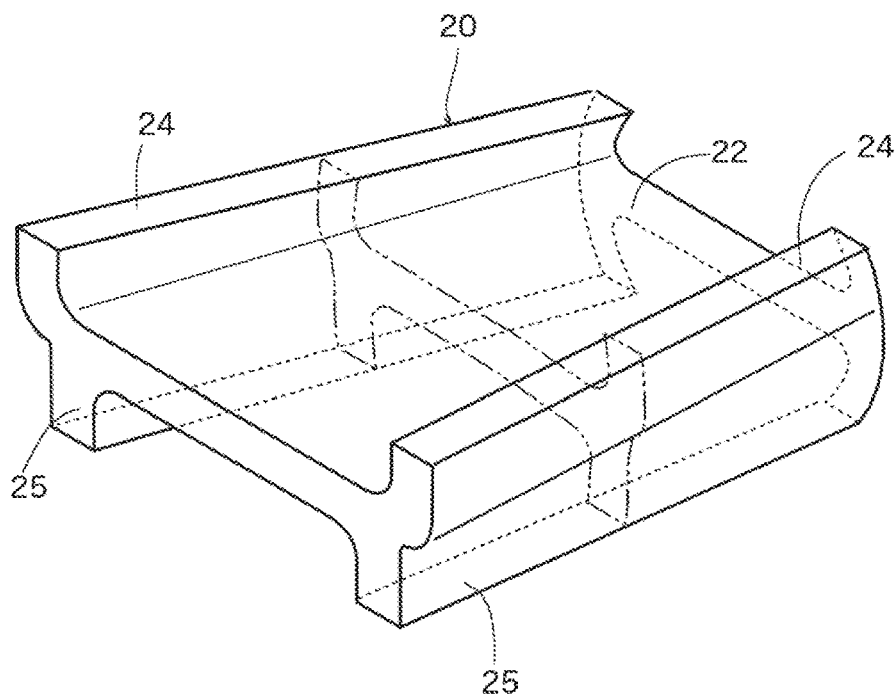
FIG. 3 is a perspective view showing an interior member (partition type) used in the suction tube of the first embodiment shown in FIG. 1.

Herein, regarding required sizes and shapes of the air-fuel mixture passage 11 and the air passage 12 of the suction tube 1A of the present embodiment, each of the passages has a substantially semi-circular shape on the inlet side (carburetor 70 side) so as to correspond to the passages 72A and 72B of the carburetor 70, while the air-fuel mixture passage 11 has a rectangular shape with a relatively large opening area on the outlet side (cylinder 50 side) and the air passage 12 has a horizontally elongated rectangular shape with a relatively large opening area on the outlet side (cylinder 50 side) so as to correspond to the scavenging passages (scavenging ports 61 and 62) arranged in pair on the left and right wall portions of the cylinder 50 (see FIGS. 2A to 2C).

With such a configuration, air is stored in advance in the scavenging passage in communication with the air port 60, via the air passage 12 of the suction tube 1A, in conjunction with the vertical movement of the piston. In the scavenging stroke, the air stored in the scavenging passage is first blown out from the scavenging ports 61 and 62 to a combustion chamber 55 above the piston, and air-fuel mixture that has been pre-compressed in a crankcase below the piston is then blown out from the scavenging ports 61 and 62 to the combustion chamber 55 above the piston, thereby discharging (scavenging) flue gases to the exhaust port.

Next, the suction tube 1A of the first embodiment will be described in detail.

The suction tube 1A includes a cylindrical exterior member 10 made of rubber that forms the outer perimeter portion of the air-fuel mixture passage 11 and the air passage 12, and an interior member 20 made of resin that divides the inside of the cylindrical exterior member 10 into the air-fuel mixture passage 11 and the air passage 12.

The inlet side end portion and outlet side end portion of the cylindrical exterior member 10 are provided with rectangular flange portions 17 and 18, respectively, that face and contact the carburetor 70 and the cylinder 50, respectively.

As clearly understood from FIGS. 2A, 2B, 2C and 3 in addition to FIG. 1, the interior member 20 has a plate-like partition portion 22 for dividing the inside of the cylindrical exterior member 10 into the air-fuel mixture passage 11 and the air passage 12, upper left and right side wall portions 24, 24 that ascend from left and right end portions on the upper surface side of the partition portion 22, and lower left and right side wall portions 25, 25 that descend from left and right end portions on the lower surface side of the partition portion 22. The inner perimeter portion of the cylindrical exterior member 10 has formed thereon upper side fitting grooves 14, 14 and lower side fitting grooves 15, 15 that are formed continuous with each other in the vertical direction, into which the upper left and right side wall portions 24, 24 and the lower left and right side wall portions 25, 25 are fitted, respectively.

If the cylindrical exterior member 10 does not have the upper side fitting grooves 14, 14 or the lower side fitting grooves 15, 15, the inlet side thereof is in a circular shape with a relatively small diameter and the outlet side thereof is in a relatively large combined shape of an elongated rectangle and a rectangle, and the shape of the cylindrical exterior member 10 continuously and smoothly changes from the circular shape to the combined shape of rectangles from the inlet side toward the outlet side.

The suction tube 1A of the present embodiment that includes the two components of the cylindrical exterior member 10 made of rubber and the interior member 20 made of resin, as sated above, is assembled such that with the use of the elastic deformation of the cylindrical exterior member 10 made of rubber, the partition-type interior member 20 is inserted into the cylindrical exterior member 10 to be attached thereto.

Specifically, the interior member 20 is inserted, with its inlet side (which is slightly narrower than the outlet side) as the head in the direction of the insertion, from the outlet side of the cylindrical exterior member 10 such that the upper left and right side wall portions 24, 24 and the lower left and right side wall portions 25, 25 of the interior member 20 are inserted and pushed into the upper side fitting grooves 14, 14 and the lower side fitting grooves 15, 15, respectively, until the end face on the inlet side of the interior member 20 reaches the end face on the inlet side of the cylindrical exterior member 10. Through such insertion, the entire lengths (the lengths from the inlet side to the outlet side) of the upper left and right side wall portions 24, 24 and the lower left and right side wall portions 25, 25 are tightly fitted into the upper side fitting grooves 14, 14 and the lower side fitting grooves 15, 15, respectively, so that the cylindrical exterior member 10 and the interior member 20 are integrally formed. In this case, the sizes and shapes of the portions are set such that the inner perimeter surface of the cylindrical exterior member 10 and the inner perimeter surfaces of the upper left and right side wall portions 24, 24 and the lower left and right side wall portions 25, 25 of the interior member 20 become flush with each other. Accordingly, the interior member 20 made of resin is securely disposed inside the cylindrical exterior member 10 made of rubber.

For securely attaching the suction tube 1A of the present embodiment to the cylinder 50 and the carburetor 70, for example, flanges 27 and 28 each made of a sheet metal are baked on the flange portions 17 and 18, respectively, and the flanges 27 and 28 are securely fastened with bolts (not shown) to the carburetor 70 and the cylinder 50, respectively. It should be noted that in the suction tube 1A of the present embodiment, the thickness of the partition portion 22 of the interior member 20 is substantially the same as that of the throttle valve 75 of the carburetor 70 and that of a partition portion between the air port 60 and the air-fuel mixture port 65 of the cylinder 50.

As stated above, since the suction tube 1A of the present embodiment is configured such that the two components of the cylindrical exterior member 10 made of rubber and the partition-type interior member 20 made of resin that have been individually formed are assembled together, a mold with a complex structure is not required, the flexibility in designing the shapes and layouts of the air-fuel mixture passage 11 and the air passage 12 can be improved, and continuous and smooth changes in the shapes of the cross sections of the air-fuel mixture passage 11 and the air passage 12 from the inlet side toward the outlet side are easily realized. Therefore, the air-fuel mixture and air smoothly flow and as a result, the required engine performance can be obtained.

Further, since the partition-type interior member 20 is attached to and formed integrally with the inside of the cylindrical exterior member 10 such that it is inserted into the cylindrical exterior member 10 with the use of the elastic deformation of the cylindrical exterior member 10 made of rubber, it is possible to reduce the number of components, facilitate the attachment and assembly, and reduce the production cost as compared to traditional suction tubes that are formed such that an air-fuel mixture passage and an air passage, which are formed of individual tubular members, are connected together using an adapter or the like.

Furthermore, since the cylindrical exterior member 10 to be securely attached to the cylinder 50 and the carburetor 70 is made of rubber, a higher heat insulation effect can be obtained as compared to when the cylindrical exterior member 10 is made of resin. Also, since the opposite end faces (end faces of the outlet side flange portion 18 and inlet side flange portion 17) of the cylindrical exterior member 10 made of rubber are directly pressed against the cylinder 50 and the carburetor 70, another advantageous effect of eliminating the use of gaskets or the like for sealing can also be obtained.

Moreover, for example, in portable power working machines such as a chain saw that use, as the power source, the stratified scavenging two-stroke engine 8 with the suction tube 1A of the present embodiment, due to a change in the posture or the like during the operation, for instance, non-vaporized raw fuel accumulated in portions of the air-fuel mixture passage 11 may rapidly flow into the combustion chamber 55, thereby possibly causing an engine trouble. For preventing such occurrence, the suction tube 1A of the present embodiment may be configured as follows.

Specifically, since the cylindrical exterior member 10 is made of rubber, the inner perimeter portion thereof, in particular, the portion that forms the air-fuel mixture passage 11 may be provided with a flow controlling portion with microscopic asperities or the like. When the portion of the air-fuel mixture passage 11 of the cylindrical exterior member 10 is provided with the flow controlling portion with microscopic asperities or the like, the rapid inflow of non-vaporized raw fuel is suppressed so as to stabilize the engine speed or the like, and the occurrence of engine troubles can be reduced as well. It should be noted that such a flow controlling portion may include a weir, groove, or dent, as well as microscopic asperities, or may be in a satin or emboss form.

Variation of the First Embodiment

Figure 4:
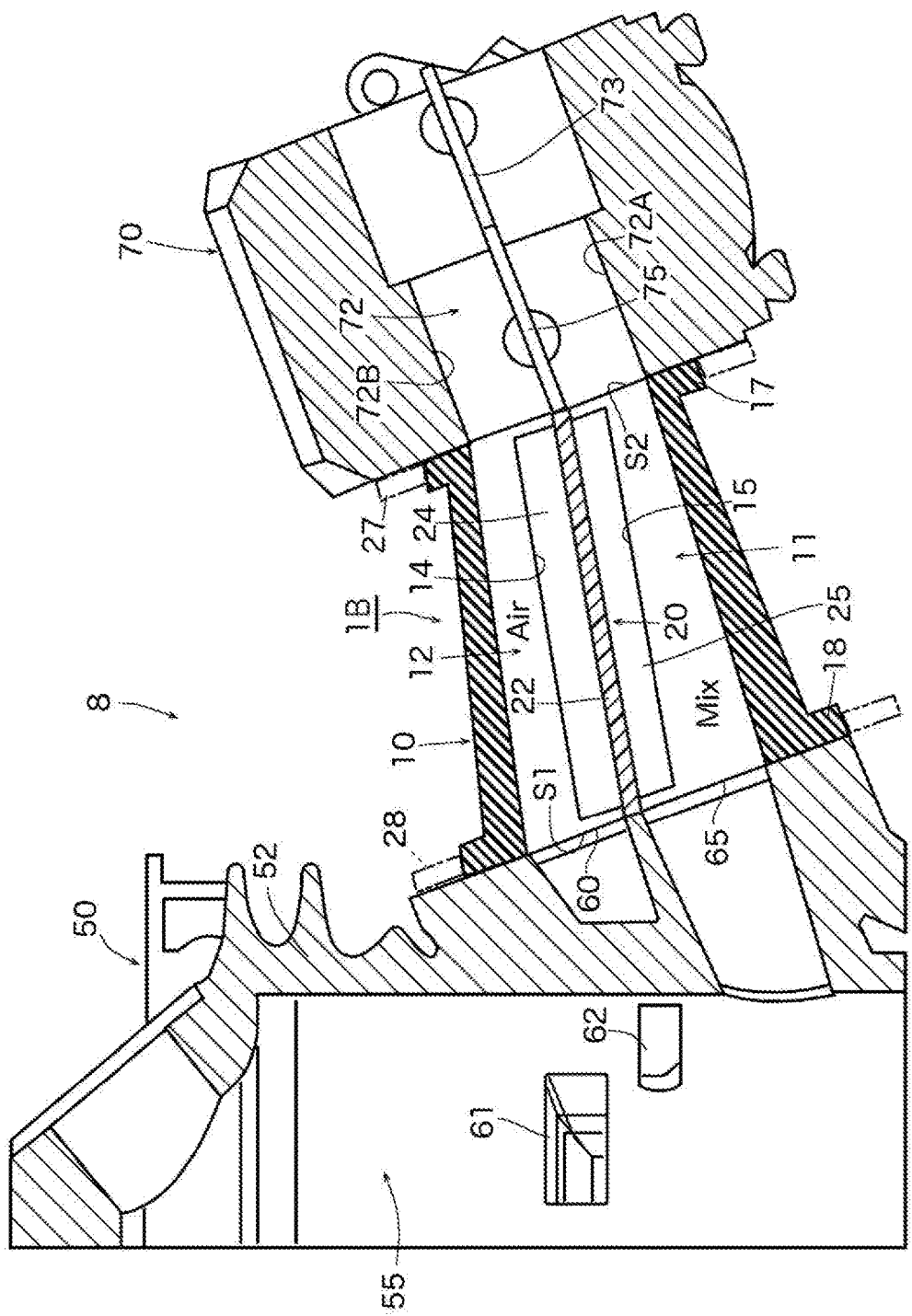
FIG. 4 is a schematic cross-sectional view showing the main part of the stratified scavenging two-stroke engine to which a variation of the suction tube of the first embodiment shown in FIG. 1 is applied.

FIG. 4 shows the main part of the stratified scavenging two-stroke engine 8 to which a suction tube 1B as a variation with some improvements made to the suction tube 1A of the first embodiment shown in FIG. 1 is applied.

In the suction tube 1B of the present variation, the configurations of the opposite end faces (end faces of the outlet side flange portion 18 and the inlet side flange portion 17) of the cylindrical exterior member 10 are changed from those of the aforementioned suction tube 1A of the first embodiment. The other configurations are basically the same, and thus portions that correspond to those of the suction tube 1A of the first embodiment are assigned the same reference numerals and overlapping explanations will be omitted.

In the aforementioned suction tube 1A of the first embodiment, the entire length of each of the upper left and right side wall portions 24, 24 and the lower left and right side wall portions 25, 25 of the interior member 20 and the upper side fitting grooves 14, 14 and the lower side fitting grooves 15, 15 of the cylindrical exterior member 10 is equivalent to the entire length of each of the cylindrical exterior member 10 and the partition portion 22, while in the suction tube 1B of the present variation, the entire length of each of the upper left and right side wall portions 24, 24 and the lower left and right side wall portions 25, 25 of the interior member 20 and the upper side fitting grooves 14, 14 and the lower side fitting grooves 15, 15 of the cylindrical exterior member 10 is shorter than the entire length of each of the cylindrical exterior member 10 and the partition portion 22.

With the aforementioned configuration, sealing surfaces S1 and S2 (opposite end faces of the cylindrical exterior member 10 made of rubber (end faces of the outlet side flange portion 18 and the inlet side flange portion 17)) that are directly pressed against the cylinder 50 and the carburetor 70, respectively, each have an increased area, thereby improving the sealability between the suction tube 1B and the cylinder 50 and between the suction tube 1B and the carburetor 70.

It should be noted that in the aforementioned first embodiment, the cylindrical exterior member 10 and the interior member 20 are made of rubber and resin, respectively. However, conversely, the cylindrical exterior member 10 and the interior member 20 may be made of resin and rubber, respectively. In the latter case, portions of the cylindrical exterior member 10 (for example, the flange portions 17 and 18) can be provided with attaching portions for the attachment to the carburetor 70 and the cylinder 50.

Second Embodiment

Figure 5:
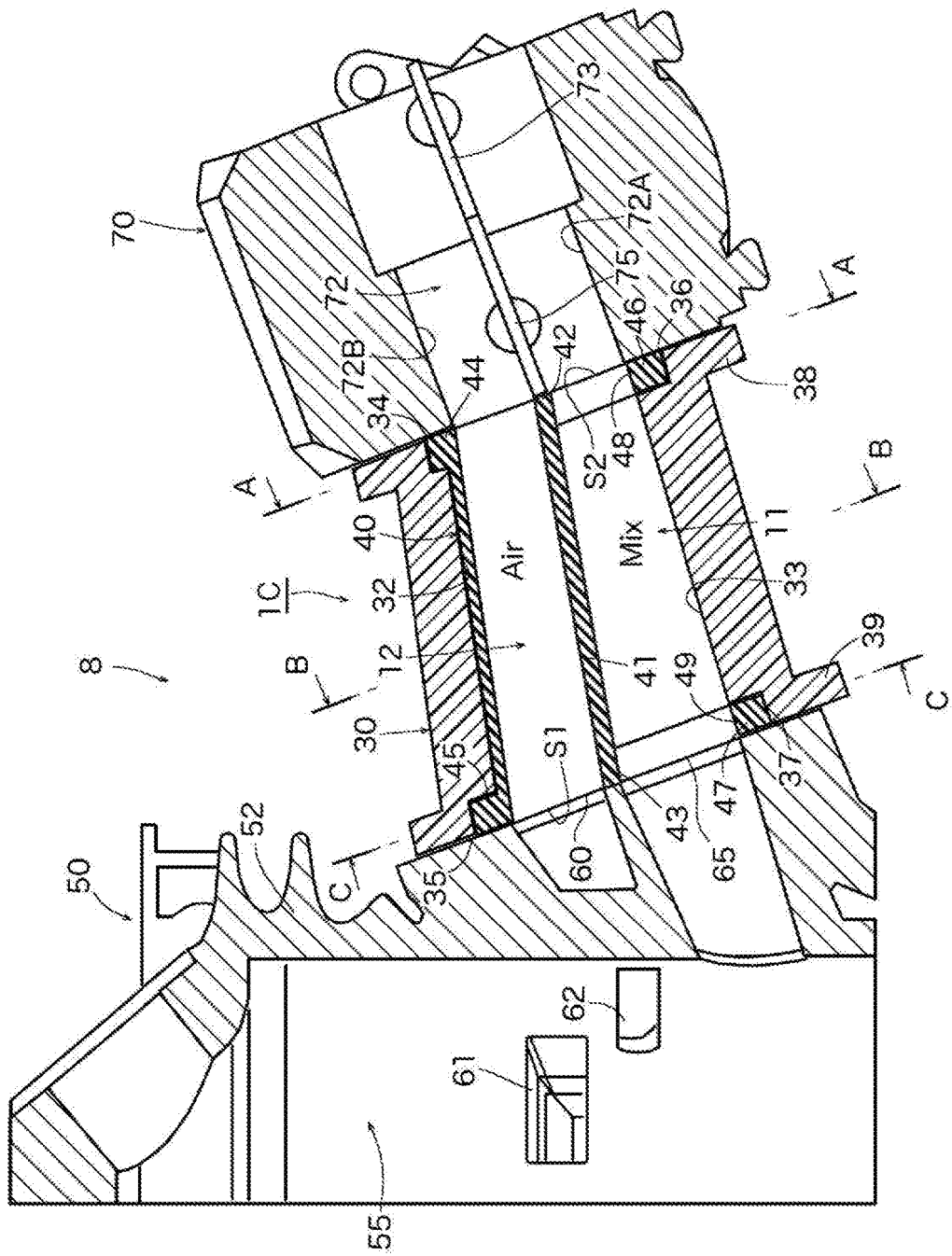
FIG. 5 is a schematic cross-sectional view showing the main part of the stratified scavenging two-stroke engine to which a second embodiment of the suction tube of the stratified scavenging engine according to the present invention is applied.
Figure 6A:
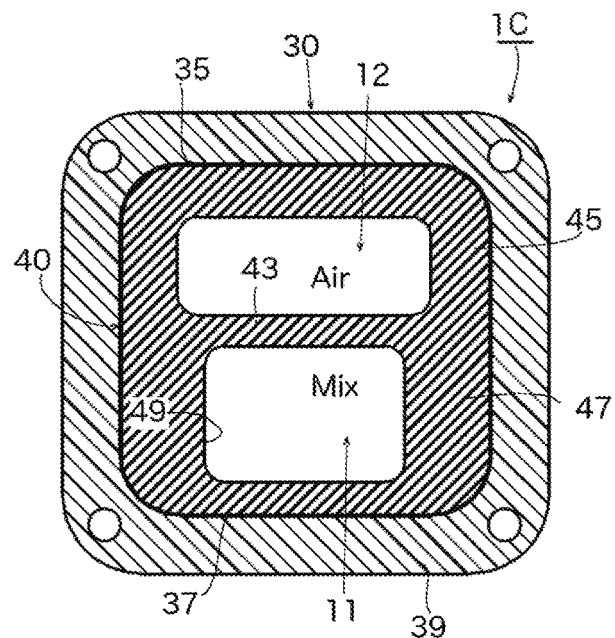
FIG. 6A is a cross-sectional view taken along line C-C of FIG. 5.
Figure 6B:
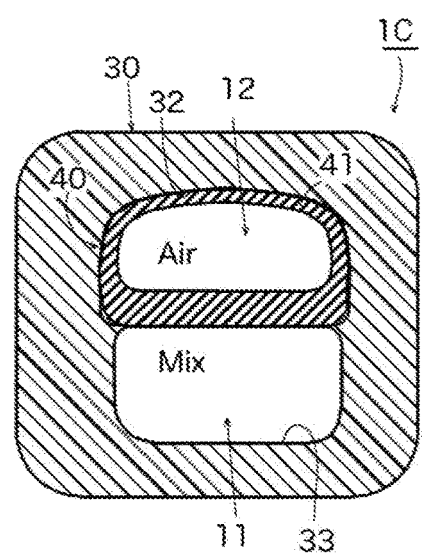
FIG. 6B is a cross-sectional view taken along line B-B of FIG. 5.
Figure 6C:
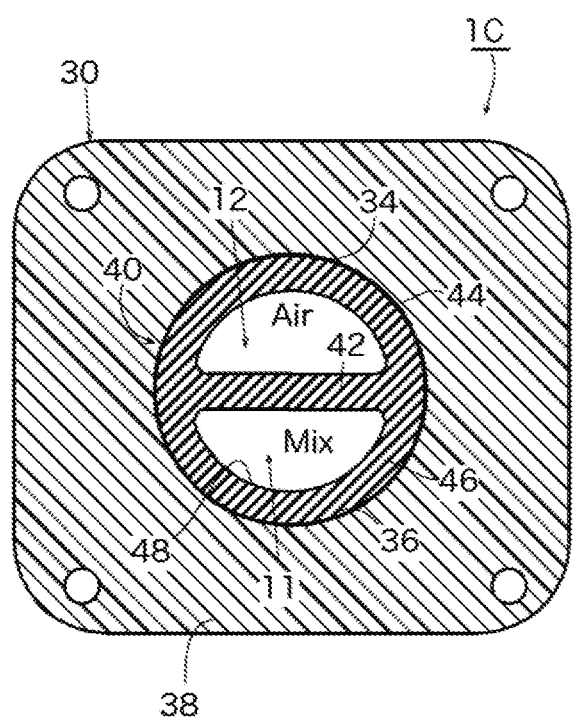
FIG. 6C is a cross-sectional view taken along line A-A of FIG. 5.
Figure 7:
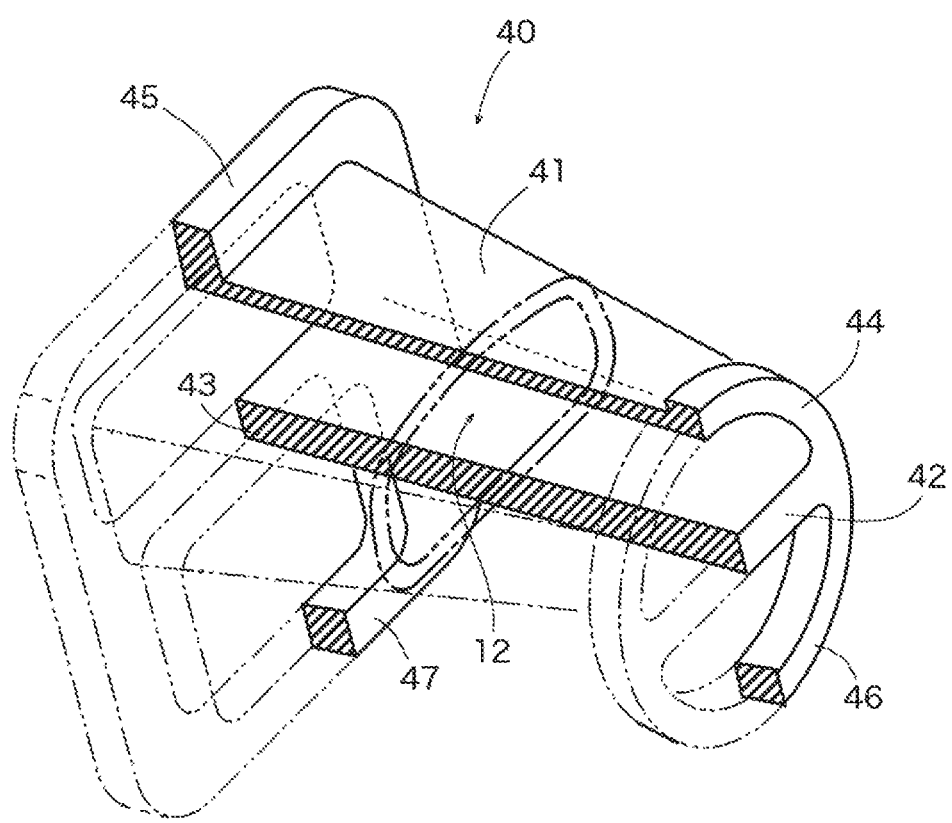
FIG. 7 is a perspective half-sectional view showing an interior member (tubular type) used in the suction tube of the second embodiment shown in FIG. 5.

FIG. 5 is a schematic cross-sectional view showing the main part of the stratified scavenging two-stroke engine to which a second embodiment of the suction tube of the stratified scavenging engine according to the present invention is applied.

With respect to the stratified scavenging two-stroke engine 8 shown in the drawing as an example, the second embodiment has the same configurations as those of portions (cylinder 50, carburetor 70, and the like) of the first embodiment, except for a suction tube 1C. Thus, portions that correspond to those of the first embodiment are assigned the same reference numerals and overlapping explanations will be omitted, and the following explanation will focus on the differences between the suction tube 1A of the first embodiment and the suction tube 1C of the second embodiment.

As clearly understood from FIGS. 6A, 6B, 6C and 7 in addition to FIG. 5, the suction tube 1C of the second embodiment includes a cylindrical exterior member 30 made of resin that forms the outer perimeter portion of the air-fuel mixture passage 11 and the air passage 12, and an interior member 40 made of rubber that divides the inside of the cylindrical exterior member 30 into the air-fuel mixture passage 11 and the air passage 12 therein.

The inlet side end portion and outlet side end portion of the cylindrical exterior member 30 are provided with rectangular flange portions 38 and 39, respectively. The flange portions 38 and 39 face and contact the carburetor 70 and the cylinder 50, respectively, and are used for securely attaching the suction tube 1C to the carburetor 70 and the cylinder 50.

The interior member 40 made of rubber has a tubular portion 41 for forming the air passage 12, an inlet side flange portion 44 provided on the inlet side of the tubular portion 41, and an outlet side flange portion 45 provided on the outlet side of the tubular portion 41. The inlet side end portion and outlet side end portion of the cylindrical exterior member 30 have formed thereon an inlet side fitting groove 34 in a semi-circular shape as viewed from the front and an outlet side fitting groove 35 in an elongated rectangular shape as viewed from the front, into which the inlet side flange portion 44 and the outlet side flange portion 45 are fitted, respectively.

The portion between the inlet side flange portion 44 and the outlet side flange portion 45 of the tubular portion 41 of the interior member 40 is tightly fitted and inserted into an insertion hole 32 formed in the upper half portion inside the cylindrical exterior member 30. A through-hole 33 formed in the lower half portion inside the cylindrical exterior member 30 forms the air-fuel mixture passage 11.

Although the drawing is omitted, it should be noted that for firmly retaining the interior member 40 inside the cylindrical exterior member 30, for example, a partition portion for insertion for inserting the portion between the inlet side flange portion 44 and the outlet side flange portion 45 of the tubular portion 41 may be provided near the center in the vertical direction inside the cylindrical exterior member 30, so that the portion between the inlet side flange portion 44 and the outlet side flange portion 45 of the tubular portion 41 of the interior member 40 is tightly fitted and inserted into the insertion hole 32 formed by the partition portion for insertion and the inner perimeter surface above the partition portion for insertion of the cylindrical exterior member 30, and the through-hole 33 formed by the partition portion for insertion and the inner perimeter surface below the partition portion for insertion of the cylindrical exterior member 30 forms the air-fuel mixture passage 11.

Herein, in the suction tube 1C of the present embodiment, the inlet side flange portion 44 and the outlet side flange portion 45 and the inlet side fitting groove 34 and the outlet side fitting groove 35 extend to the side of a passage that is not the passage (air passage) 12 formed by the tubular portion 41, that is, the side of the air-fuel mixture passage 11. An extended portion 46 of the inlet side flange portion 44 forms a semi-circular inlet 48 of the air-fuel mixture passage 11 in cooperation with a center bridge portion 42, and an extended portion 47 of the outlet side flange portion 45 forms a rectangular outlet 49 of the air-fuel mixture passage 11 in cooperation with a center bridge portion 43. It should be noted that the center bridge portions 42 and 43 are disposed in a position that corresponds to the throttle valve 75 of the carburetor 70 and a position that faces the partition portion between the air port 60 and the air-fuel mixture port 65 of the cylinder 50, respectively.

Further, the extended portion 46 of the inlet side flange portion 44 and the extended portion 47 of the outlet side flange portion 45 are fitted into an extended portion 36 of the inlet side fitting groove 34 and an extended portion 37 of the outlet side fitting groove 35, respectively. The inlet side flange portion 44 and its extended portion 46 together form an annular shape as viewed from the front (see FIG. 6C and FIG. 7) and the outlet side flange portion 45 and its extended portion 47 together form a rectangular annular shape as viewed from the front (see FIG. 6A and FIG. 7).

The suction tube 1C of the present embodiment that includes the two components of the cylindrical exterior member 30 made of resin and the interior member 40 made of rubber, as sated above, is assembled such that with the use of the elastic deformation of the tubular-type interior member 40 made of rubber, the tubular-type interior member 40 is pushed into the cylindrical exterior member 30 to be attached thereto.

Specifically, the tubular portion 41 of the interior member 40 is inserted into the insertion hole 32 (that is, the upper half portion inside the cylindrical exterior member 30), for example, with folded portions of the inlet side flange portion 44 and its extended portion 46 that together form an annular shape as viewed from the front, as the head in the direction of the insertion, from the outlet side of the cylindrical exterior member 30, until the inlet side flange portion 44 and its extended portion 46 are fitted into the inlet side fitting groove 34 and its extended portion 36, respectively. Through such insertion, the tubular portion 41 is tightly fitted and inserted into (contacts and faces) the insertion hole 32, and the inlet side flange portion 44 and its extended portion 46 are tightly fitted to the inlet side fitting groove 34 and its extended portion 36, respectively, and also the outlet side flange portion 45 and its extended portion 47 that together form a rectangular annular shape as viewed from the front are tightly fitted into the outlet side fitting groove 35 and its extended portion 37, respectively, so that the tubular-type interior member 40 and the cylindrical exterior member 30 are integrally formed. Accordingly, the interior member 40 made of rubber is securely disposed inside the cylindrical exterior member 30 made of resin.

For securely attaching the suction tube 1C of the present embodiment to the cylinder 50 and the carburetor 70, for example, the rectangular flange portions 39 and 38 are securely fastened with bolts (not shown) to the cylinder 50 and the carburetor 70, respectively. In this case, the interior member 40 made of rubber is slightly made longer than the cylindrical exterior member 30, for example, so that the opposite end faces (the outlet side flange portion 45 and its extended portion 47 and the inlet side flange portion 44 and its extended portion 46) of the interior member 40 made of rubber are directly pressed against the cylinder 50 and the carburetor 70 so as to form sealing surfaces S1 and S2. This can eliminate the use for gaskets or the like for sealing.

As stated above, since the suction tube 1C of the present embodiment is configured such that the two components of the cylindrical exterior member 30 made of resin and the tubular-type interior member 40 made of rubber that have been individually formed are assembled together, similarly to the aforementioned suction tube 1A of the first embodiment, the flexibility in designing the shapes and layouts of the air-fuel mixture passage 11 and the air passage 12 can be improved, and continuous and smooth changes in the shapes of the cross sections of the air-fuel mixture passage 11 and the air passage 12 from the inlet side toward the outlet side are easily realized. Therefore, the air-fuel mixture and air smoothly flow and as a result, the required engine performance can be obtained.

Further, since the tubular-type interior member 40 is attached to and formed integrally with the inside of the cylindrical exterior member 30 made of resin such that it is pushed into the cylindrical exterior member 30 with the use of the elastic deformation of the interior member 40 made of rubber, it is possible to reduce the number of components, facilitate the attachment and assembly, and reduce the production cost as compared to traditional suction tubes that are formed such that an air-fuel mixture passage and an air passage, which are formed of individual tubular members, are connected together using an adapter or the like.

Furthermore, in the suction tube 1C of the present embodiment, since the portion of the air-fuel mixture passage 11 is basically made of resin, it is difficult to provide a flow controlling portion as in the first embodiment. Instead, the suction tube 1C has an advantageous effect of being less susceptible to swelling or wetting caused by gasoline.

Moreover, in the suction tube 1C of the present embodiment, since the flange portions 39 and 38 provided on the cylindrical exterior member 30 made of resin function as attaching portions for the attachment of the suction tube 1C to the cylinder 50 and the carburetor 70, the use of a flange made of a sheet metal or the like, for example, can be eliminated and the number of components can be further reduced.

It should be noted that in the aforementioned second embodiment, for securing the sealability with a fewer number of components, the inlet side flange portion 44 and the outlet side flange portion 45 as well as the inlet side fitting groove 34 and the outlet side fitting groove 35 all extend to the side of a passage that is not the passage (air passage) 12 formed by the tubular portion 41, that is, the side of the air-fuel mixture passage 11. However, considering the ease of assembly or the like, only the inlet side flange portion 44 and the outlet side flange portion 45 or only the inlet side fitting groove 34 and the outlet side fitting groove 35 may be extended to the side of the air-fuel mixture passage 11, so that the inlet 48 or the outlet 49 of the air-fuel mixture passage 11 may be formed on the extended portion 46 of the inlet side flange portion 44 or the extended portion 47 of the outlet side flange portion 45.

Variation (1) of the Second Embodiment

Figure 8:
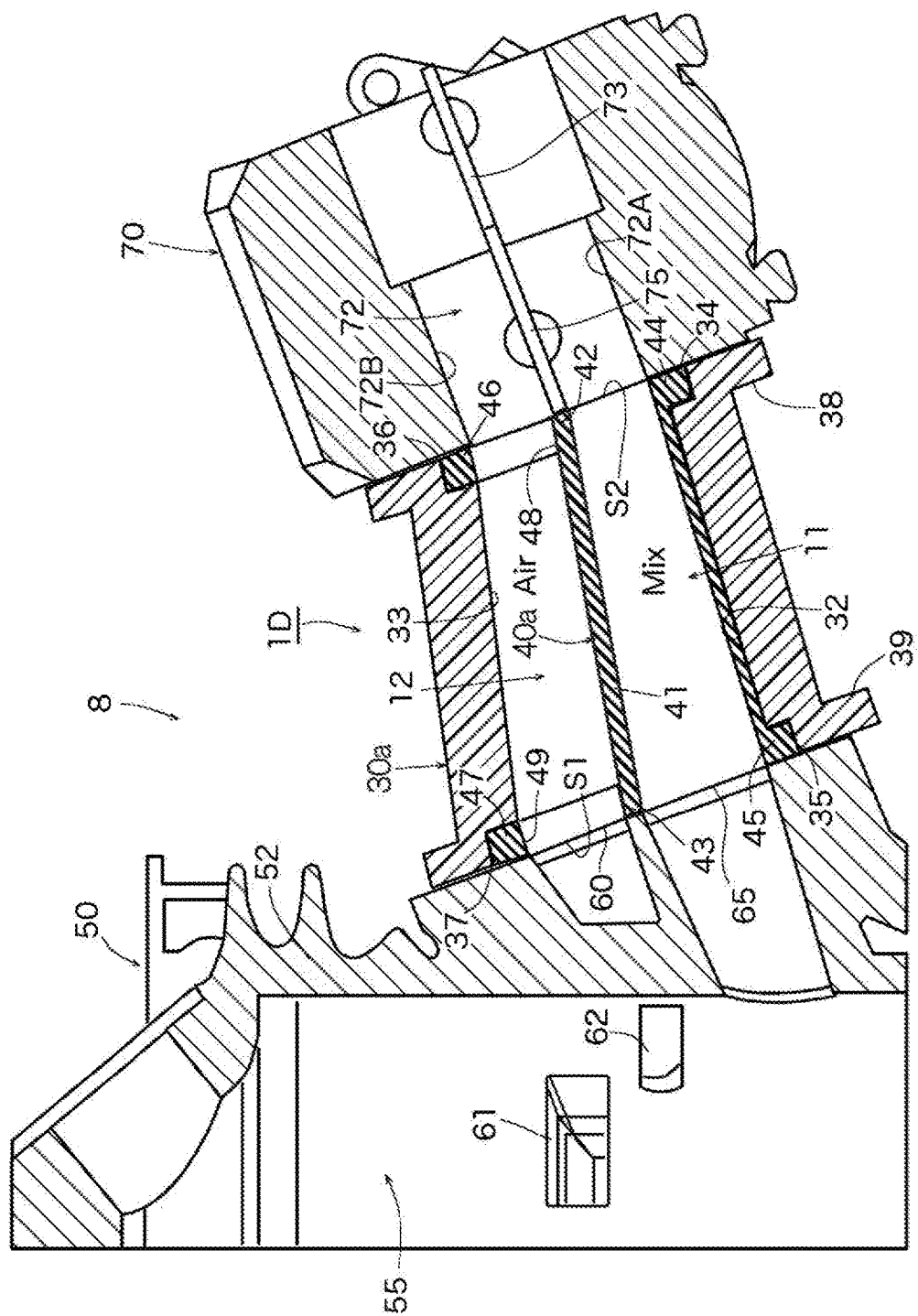
FIG. 8 is a schematic cross-sectional view showing the main part of the stratified scavenging two-stroke engine to which a variation (1) of the suction tube of the second embodiment shown in FIG. 5 is applied.

FIG. 8 shows the main part of the stratified scavenging two-stroke engine 8 to which a suction tube 1D as a variation of the suction tube 1C of the second embodiment shown in FIG. 5 is applied.

In the suction tube 1D of the present variation, the arrangement in the interior member is changed from that of the aforementioned suction tube 1C of the second embodiment. The other configurations are basically the same, and thus portions that correspond to those of the suction tube 1C of the second embodiment are assigned the same reference numerals and overlapping explanations will be omitted.

In the aforementioned suction tube 1C of the second embodiment, the tubular-type interior member 40 made of rubber (or the tubular portion 41 thereof) is retained on the upper side inside the cylindrical exterior member 30 made of resin so that the interior member 40 forms the air passage 12, while in the suction tube 1D of the present variation, a tubular-type interior member 40a made of rubber (or the tubular portion 41 thereof) is retained on the lower side inside a cylindrical exterior member 30a made of resin so that the interior member 40a forms the air-fuel mixture passage 11.

Also in the suction tube 1D of the present variation, substantially the same function and effects as those of the suction tube 1C of the second embodiment can be obtained. In addition, since the air-fuel mixture passage 11 is formed by the tubular-type interior member 40a made of rubber, the inner perimeter portion of the tubular portion 41 of the interior member 40a can be provided with a flow controlling portion with microscopic asperities or the like, similarly to the suction tube 1A of the first embodiment. With such provision, the rapid inflow of non-vaporized raw fuel to the combustion chamber 55 is suppressed so as to stabilize the engine speed or the like, and the occurrence of engine troubles can be reduced as well.

Variation (2) of the Second Embodiment

Figure 9:
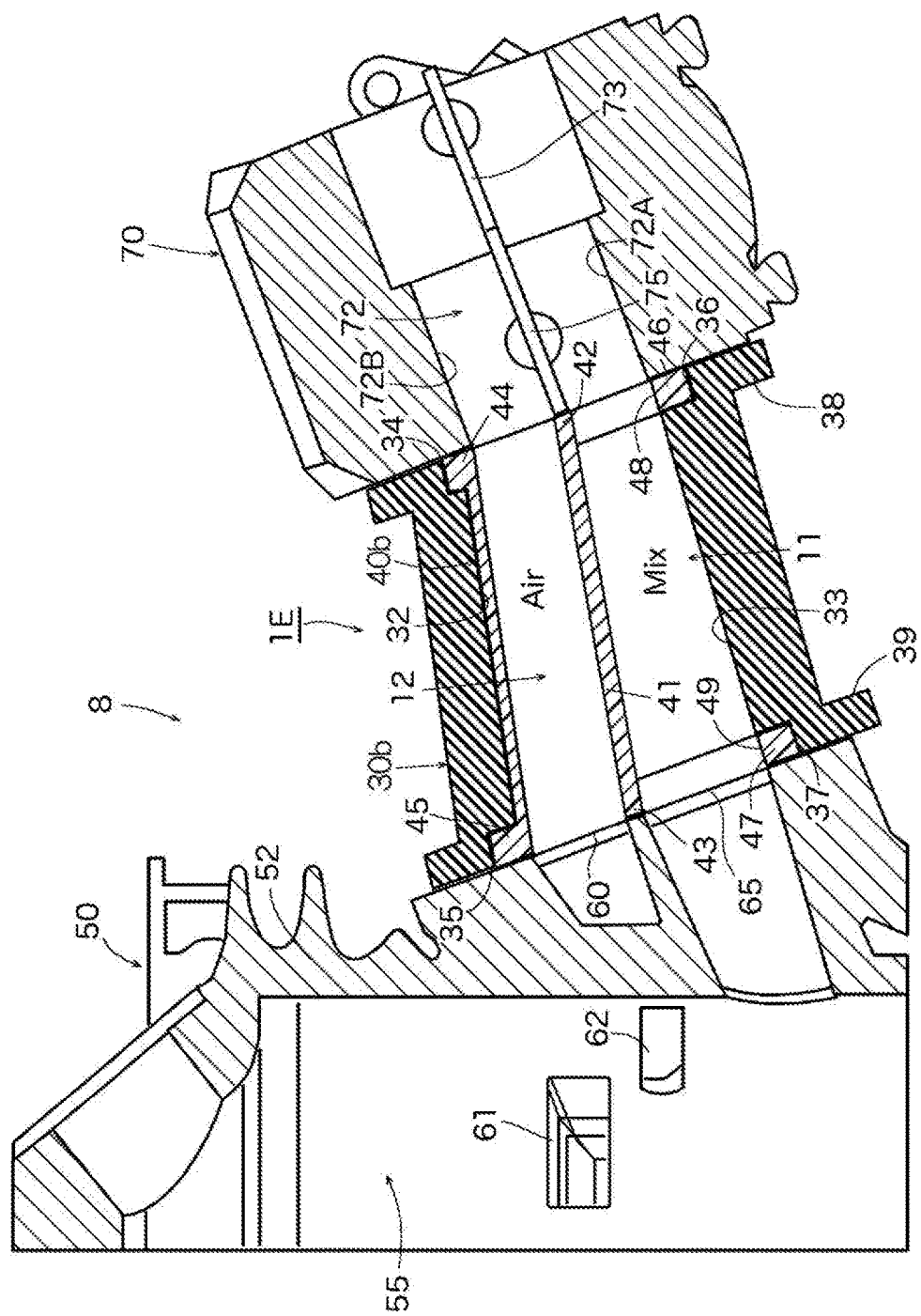
FIG. 9 is a schematic cross-sectional view showing the main part of the stratified scavenging two-stroke engine to which a variation (2) of the suction tube of the second embodiment shown in FIG. 5 is applied.

FIG. 9 shows the main part of the stratified scavenging two-stroke engine 8 to which a suction tube 1E as a variation of the suction tube 1C of the second embodiment shown in FIG. 5 is applied.

In the suction tube 1E of the present variation, the materials of the cylindrical exterior member and the interior member are changed from those of the suction tube 1C of the second embodiment. The other configurations are basically the same, and thus portions that correspond to those of the suction tube 1C of the second embodiment are assigned the same reference numerals and overlapping explanations will be omitted.

In the aforementioned suction tube 1C of the second embodiment, the cylindrical exterior member 30 and the interior member 40 are made of resin and rubber, respectively, while in the suction tube 1E of the present variation, although the shapes of a cylindrical exterior member 30b and the cylindrical exterior member 30 and also the shapes of an interior member 40b and the interior member 40 are substantially the same, the cylindrical exterior member 30b and the interior member 40b are made of rubber and resin, respectively. The suction tube 1C is assembled such that with the use of the elastic deformation of the cylindrical exterior member 30b made of rubber, the tubular-type interior member 40b is inserted into the cylindrical exterior member 30b to be attached thereto.

Since the suction tube 1E of the present variation with the aforementioned configuration also includes the two components of the cylindrical exterior member 30b made of rubber and the tubular-type interior member 40b made of resin, substantially the same function and effects as those of the suction tube 1A of the first embodiment and the suction tube 1C of the second embodiment described above can be obtained. In addition, similarly to the first embodiment, since the cylindrical exterior member 30b is made of rubber, the inner perimeter portion thereof, in particular, the portion that forms the air-fuel mixture passage 11 can be provided with a flow controlling portion with microscopic asperities or the like. With such provision, the rapid inflow of non-vaporized raw fuel to the combustion chamber 55 is suppressed so as to stabilize the engine speed or the like, and the occurrence of engine troubles can be reduced as well.

Variation (3) of the Second Embodiment

Figure 10:
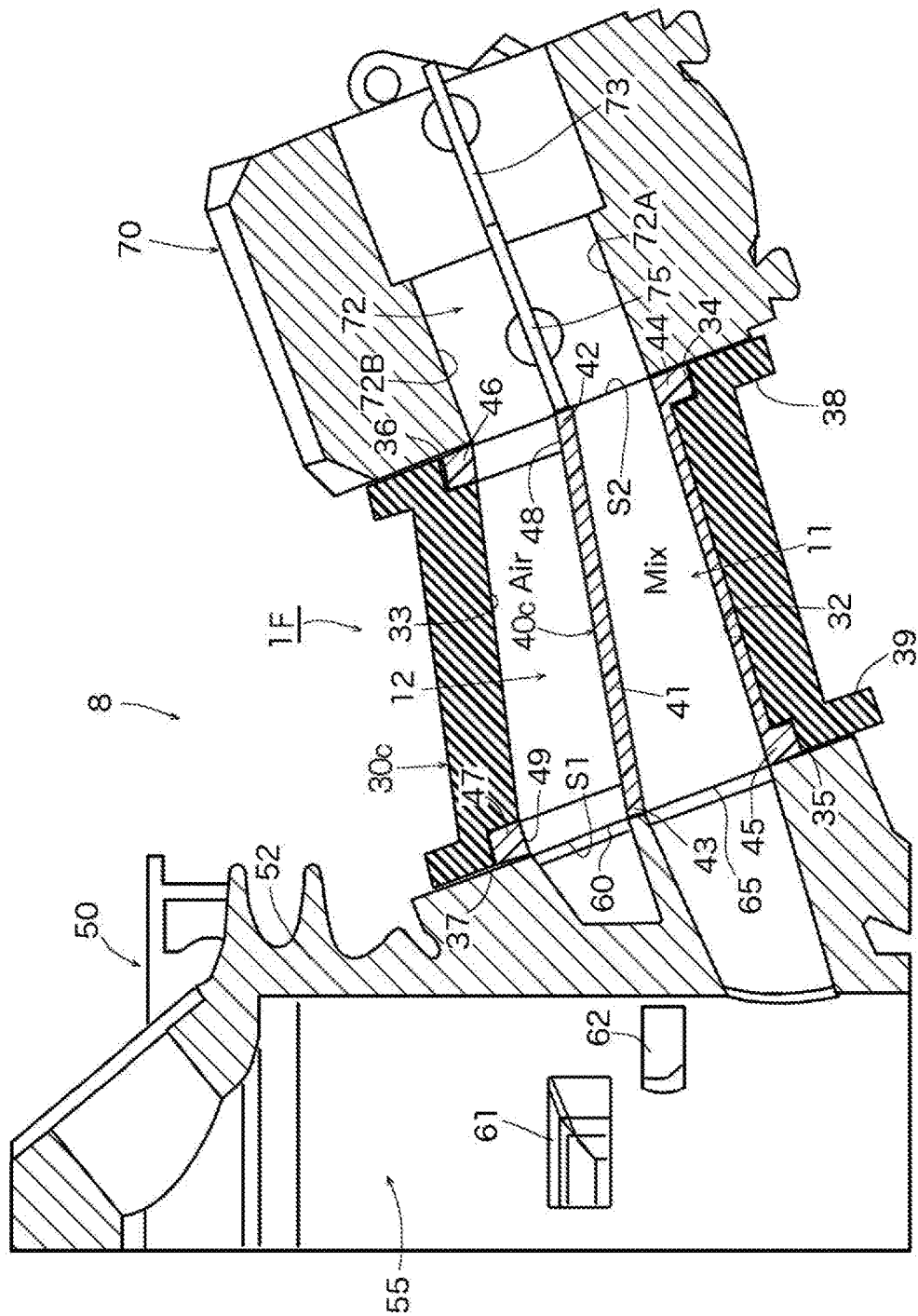
FIG. 10 is a schematic cross-sectional view showing the main part of the stratified scavenging two-stroke engine to which a variation (3) of the suction tube of the second embodiment shown in FIG. 5 is applied.

FIG. 10 shows the main part of the stratified scavenging two-stroke engine 8 to which a suction tube 1F as a variation of the suction tube 1C of the second embodiment shown in FIG. 5 is applied.

In the suction tube 1F of the present variation, the materials of a cylindrical exterior member 30c and an interior member 40c are changed from those of the cylindrical exterior member and interior member of the aforementioned suction tube 1D as the variation shown in FIG. 8 (in other words, the arrangement in the interior member is changed from that of the aforementioned suction tube 1E as the variation shown in FIG. 9). The other configurations are basically the same, and thus portions that correspond to those of the suction tube 1D (or the suction tube 1E) are assigned the same reference numerals.

It is obvious without need to describe in detail that also in the suction tube 1F of the present variation, substantially the same function and effects as those of the aforementioned suction tube 1C of the second embodiment can be obtained.

Although the embodiments and their variations of the present invention have been described above, it is needless to say that the suction tube according to the present invention is not limited to the aforementioned examples. Multiple variations can be conceived of depending on the materials (resin, rubber, or others) of the cylindrical exterior member and interior member, the type of the interior member (partition type, tubular type, or a combination thereof), which of the air-fuel mixture passage and the air passage is to be formed by the tubular portion when the interior member is in a tubular type, and the like.

For example, the interior member may include a partition portion for partially dividing the inside of the cylindrical exterior member (that is, a portion of the entire length of the cylindrical exterior member from the inlet side to the outlet side) into the air-fuel mixture passage and the air passage, and a tubular portion for forming a portion (a portion other than the portion to be divided by the partition portion) of one of the air-fuel mixture passage and the air passage. When the interior member includes these, the cylindrical exterior member is provided with a retaining portion for retaining the interior member therein, as appropriate.

Further, in the aforementioned embodiments and variations, when the interior member is in a tubular type, one of the cylindrical exterior member and the interior member forms the entire air-fuel mixture passage and the other of the cylindrical exterior member and the interior member forms the entire air passage. However, the interior member may include a tubular portion for forming one of the air-fuel mixture passage and the air passage and a short tubular portion (which is relatively shorter than the tubular portion) for forming a portion (a portion on the inlet side, a portion on the outlet side, an intermediate portion, or the like) of the other of the air-fuel mixture passage and the air passage, with the remaining portion of the air-fuel mixture passage and the air passage formed by the cylindrical exterior member. In this case, the cylindrical exterior member is provided with a retaining portion for retaining the interior member therein, as appropriate.

Through adoption of the aforementioned variations, it is possible to realize configurations, for example, in which a flow controlling portion with microscopic asperities or the like is provided in appropriate portions of the air-fuel mixture passage and that is less susceptible to swelling or wetting caused by gasoline.

What is claimed is:

1. A suction tube of a stratified scavenging engine including an air-fuel mixture passage and an air passage, an inlet side and an outlet side of each passage being connected to a carburetor and a cylinder, respectively, comprising: a cylindrical exterior member for mainly forming an outer perimeter portion of each of the air-fuel mixture passage and the air passage; an interior member for dividing an inside of the cylindrical exterior member into the air-fuel mixture passage and the air passage, wherein the interior member is attached to and integrally formed with the inside of the cylindrical exterior member with use of elastic deformation thereof or of the cylindrical exterior member; wherein the interior member has a partition portion for dividing the inside of the cylindrical exterior member into the air-fuel mixture passage and the air passage, upper left and right side wall portions that ascend from left and right end portions on an upper surface side of the partition portion, and lower left and right side wall portions that descend from left and right end portions on a lower surface side of the partition portion, and an inner perimeter portion of the cylindrical exterior member has formed thereon upper side fitting grooves and lower side fitting grooves into which the upper left and right side wall portions and the lower left and right side wall portions are fitted, respectively, and wherein one of the cylindrical exterior member and the interior member is made of rubber, and the other made of resin.

2. The suction tube of a stratified scavenging engine according to claim 1, wherein:
the interior member has a tubular portion for forming one of the air-fuel mixture passage and the air passage inside the cylindrical exterior member, and
the cylindrical exterior member is provided with a retaining portion for retaining the tubular portion therein.

3. The suction tube of a stratified scavenging engine according to claim 2, wherein the interior member with the tubular portion forms the air-fuel mixture passage.

4. The suction tube of a stratified scavenging engine according to claim 2, wherein the interior member with the tubular portion forms the air passage.

5. The suction tube of a stratified scavenging engine according to claim 1, wherein: the interior member has the partition portion and a tubular portion for forming a portion of one of the air-fuel mixture passage and the air passage, and the cylindrical exterior member is provided with a retaining portion for retaining the interior member therein.

6. The suction tube of a stratified scavenging engine according to claim 1, wherein:
the interior member has a tubular portion for forming one of the air-fuel mixture passage and the air passage and a short tubular portion for forming a portion of the other of the air-fuel mixture passage and the air passage, and
the cylindrical exterior member is provided with a retaining portion for retaining the interior member therein.

7. The suction tube of a stratified scavenging engine according to claim 1, wherein a surface to be sealed to the carburetor and/or a surface to be sealed to the cylinder is/are formed on an end face(s) of the cylindrical exterior member or the interior member that is made of rubber.

8. The suction tube of a stratified scavenging engine according to claim 1, wherein the cylindrical exterior member is provided with attaching portions for attachment to the carburetor and the cylinder.

* * * * *